United States Patent
Thompson

(10) Patent No.: US 8,595,219 B1
(45) Date of Patent: Nov. 26, 2013

(54) SYSTEM AND METHOD FOR CONTEXTUAL AND FREE FORMAT MATCHING OF ADDRESSES

(75) Inventor: Douglas Thompson, Skokie, IL (US)

(73) Assignee: Trans Union, LLC, Chicago, IL (US)

( * ) Notice: Subject to any disclaimer, the term of this patent is extended or adjusted under 35 U.S.C. 154(b) by 0 days.

(21) Appl. No.: 13/539,009

(22) Filed: Jun. 29, 2012

Related U.S. Application Data

(60) Provisional application No. 61/647,990, filed on May 16, 2012.

(51) Int. Cl.
*G06F 17/30* (2006.01)

(52) U.S. Cl.
USPC ............ 707/722; 707/758; 707/765; 707/769

(58) Field of Classification Search
CPC .................................. G06F 17/30; G06F 17/00
See application file for complete search history.

(56) References Cited

U.S. PATENT DOCUMENTS

| | | | |
|---|---|---|---|
| 5,274,547 A | | 12/1993 | Zoffel et al. |
| 5,553,127 A | * | 9/1996 | Norell ...................... 379/201.02 |
| 5,659,731 A | * | 8/1997 | Gustafson ............................ 1/1 |
| 6,134,304 A | * | 10/2000 | Norell ...................... 379/100.05 |
| 6,275,817 B1 | * | 8/2001 | Reed et al. ....................... 706/45 |
| 6,278,987 B1 | * | 8/2001 | Reed et al. ....................... 706/45 |
| 6,389,406 B1 | * | 5/2002 | Reed et al. ....................... 706/46 |
| 6,394,263 B1 | * | 5/2002 | McCrory ......................... 706/47 |
| 6,505,184 B1 | * | 1/2003 | Reed et al. ....................... 706/47 |
| 6,658,377 B1 | * | 12/2003 | Anward et al. .................... 704/9 |
| 6,968,348 B1 | * | 11/2005 | Carone et al. ................. 707/696 |
| 6,983,280 B2 | * | 1/2006 | Cheung et al. ........................ 1/1 |
| 7,403,938 B2 | * | 7/2008 | Harrison et al. ...................... 1/1 |
| 7,917,497 B2 | * | 3/2011 | Harrison et al. .............. 707/713 |
| 8,463,594 B2 | * | 6/2013 | Au ..................................... 704/9 |
| 2003/0069880 A1 | * | 4/2003 | Harrison et al. .................. 707/3 |
| 2003/0172025 A1 | | 9/2003 | Gallina |
| 2004/0054661 A1 | * | 3/2004 | Cheung et al. ..................... 707/3 |
| 2006/0235824 A1 | * | 10/2006 | Cheung et al. ..................... 707/1 |
| 2008/0027930 A1 | * | 1/2008 | Bohannon et al. ................ 707/6 |
| 2008/0040342 A1 | * | 2/2008 | Hust et al. ......................... 707/5 |
| 2008/0263019 A1 | * | 10/2008 | Harrison et al. .................. 707/4 |
| 2009/0006230 A1 | | 1/2009 | Lyda et al. |
| 2009/0319518 A1 | * | 12/2009 | Koudas et al. .................... 707/5 |
| 2010/0153383 A1 | | 6/2010 | Cohen |
| 2012/0117644 A1 | * | 5/2012 | Soeder ............................ 726/22 |
| 2013/0110497 A1 | * | 5/2013 | Medero et al. .................... 704/9 |
| 2013/0132365 A1 | * | 5/2013 | Chang et al. ................. 707/710 |
| 2013/0179440 A1 | * | 7/2013 | Gordon ......................... 707/731 |

* cited by examiner

*Primary Examiner* — Farhan Syed

(74) *Attorney, Agent, or Firm* — William J. Lenz; Neal, Gerber & Eisenberg LLP

(57) ABSTRACT

A system and method for the matching addresses is provided. Addresses may be received from a search engine or other source for purposes of matching. Address parts in the addresses may be contextually identified. Identified address parts, including their associated data, that have address part types that are alike may be compared to one another and a contextual matching score may be calculated and assigned. A free format token analysis of the addresses may also be performed in parallel with, before, or after, the contextual identification, and a free format matching score may be calculated. An address likeness score may be calculated and assigned based on the contextual matching score and the free format matching score.

18 Claims, 4 Drawing Sheets

SYSTEM AND METHOD FOR CONTEXTUAL AND FREE FORMAT MATCHING OF ADDRESSES

CROSS-REFERENCE TO RELATED APPLICATION

This application claims priority to U.S. Provisional Application No. 61/647,990, filed May 16, 2012, which is incorporated herein by reference in its entirety.

TECHNICAL FIELD

This invention relates to a system and method for address matching. More particularly, the invention provides a system and method for matching addresses based on contextual identification and deconstruction of the addresses into address parts, comparison of like address parts, free format token analysis of the addresses, and scoring the matching strengths based on the contextual identification and free format token analysis.

BACKGROUND OF THE INVENTION

The consumer lending industry bases its decisions to grant credit or make loans, or to give consumers preferred credit or loan terms, on the general principle of risk, i.e., risk of foreclosure. Credit and lending institutions typically avoid granting credit or loans to high risk consumers, or may grant credit or loans to such consumers at higher interest rates or on other terms less favorable than those typically granted to consumers with low risk. Consumer data, including consumer credit information, is collected and used by credit bureaus, financial institutions, and other entities for assessing creditworthiness and aspects of a consumer's financial and credit history.

In many emerging and developing markets, the available consumer data may be of a lower quality as compared to consumer data available in developed markets. For example, records of consumer data may not include a unique identification number, formats of addresses may vary, dates of births may be unreliable or non-existent, name conventions may vary, and particular names and surnames may be very popular and duplicated among a large number of people. Traditional consumer data search algorithms that are often used in developed markets do not always perform well on consumer data in emerging markets. Such traditional algorithms rely on consistent formatting of consumer data, more complete information, and information that is in discrete fields, such as house number, street name, telephone, postal code, and identification number. In developed markets, searches on consumer data may be performed relatively quickly by using a well-indexed relational database key that uses a single field, e.g., identification number or telephone, or a composite key, e.g., date of birth and name, name and house number, etc.

In particular, matching addresses in consumer data may be useful in many situations, such as determining whether database records should be merged, de-duplication of addresses for a particular consumer, verifying an address match during a dispute process, or other situations. Using traditional algorithms to match addresses that are contained in a single field may result in overmatching, i.e., false positives, for addresses with similar alphabetic and/or numerical values that are not actually matches; and/or undermatching, i.e., false negatives, for addresses that are actually matches but are not detected as matches. Accordingly, the usefulness of search results that are further filtered based on matching of addresses may be reduced if false positives are included and/or false negatives are not included. Furthermore, merging records based on false positives and/or false negatives of matched addresses may also contribute to incorrect database records.

Therefore, there is a need for an improved system and method that can accurately match addresses and accounts for the formatting and quality issues with consumer data that may be present in emerging markets, in order to, among other things, reduce overmatching and undermatching of addresses.

SUMMARY OF THE INVENTION

The invention is intended to solve the above-noted problems by providing systems and methods for the matching of addresses based on contextual identification of address portions, comparison of the identified address portions, free format token matching of addresses, and scoring the matching strengths based on the contextual identification and free format token analysis. The systems and methods are designed to, among other things: (1) contextually identify parts of addresses, based on a deterministic evaluation of strings in the address; (2) normalize the identified address parts and their associated data; (3) compare the like normalized address parts and their associated data; (4) assign a contextual matching score based on the comparison; (5) perform a free format token analysis of the addresses; (6) assign a free format matching score; and (7) assign an address likeness score, based on the contextual matching score and the free format matching score.

In a particular embodiment, a first address and a second address may be received at a processor. A contextual identification analysis may be performed on the first address and the second address to identify a first address part and second address part, respectively, that each have an address part type that is alike. The first address part and the second address part may be normalized. Data associated with the first address part and the second address part may be compared. A contextual matching score may be calculated and assigned, based on the comparison. A free format token analysis of the first address and the second address may also be performed before, in parallel with, or after the contextual identification analysis. A free format matching score may be calculated and assigned based on the free format token analysis. An address likeness score may be calculated based on the contextual matching score and the free format matching score.

In another embodiment, an address and a plurality of candidate addresses may be received at a processor. An address part of the address and a plurality of candidate address parts of the plurality of candidate addresses may be identified based on a contextual identification analysis. The address part and plurality of candidate address parts may have an address part type that is alike. Address data may be compared with a plurality of candidate address data that are respectively associated with the address part type. A contextual matching score may be calculated and assigned, based on the comparison. A free format token analysis of the address and the plurality of candidate addresses may also be performed before, in parallel with, or after the contextual identification analysis. A free format matching score may be calculated and assigned based on the free format token analysis. An address likeness score may be calculated based on the contextual matching score and the free format matching score. One or more matching addresses from the plurality of candidate addresses may be transmitted, based on the address likeness score.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF THE INVENTION

Figure 1:
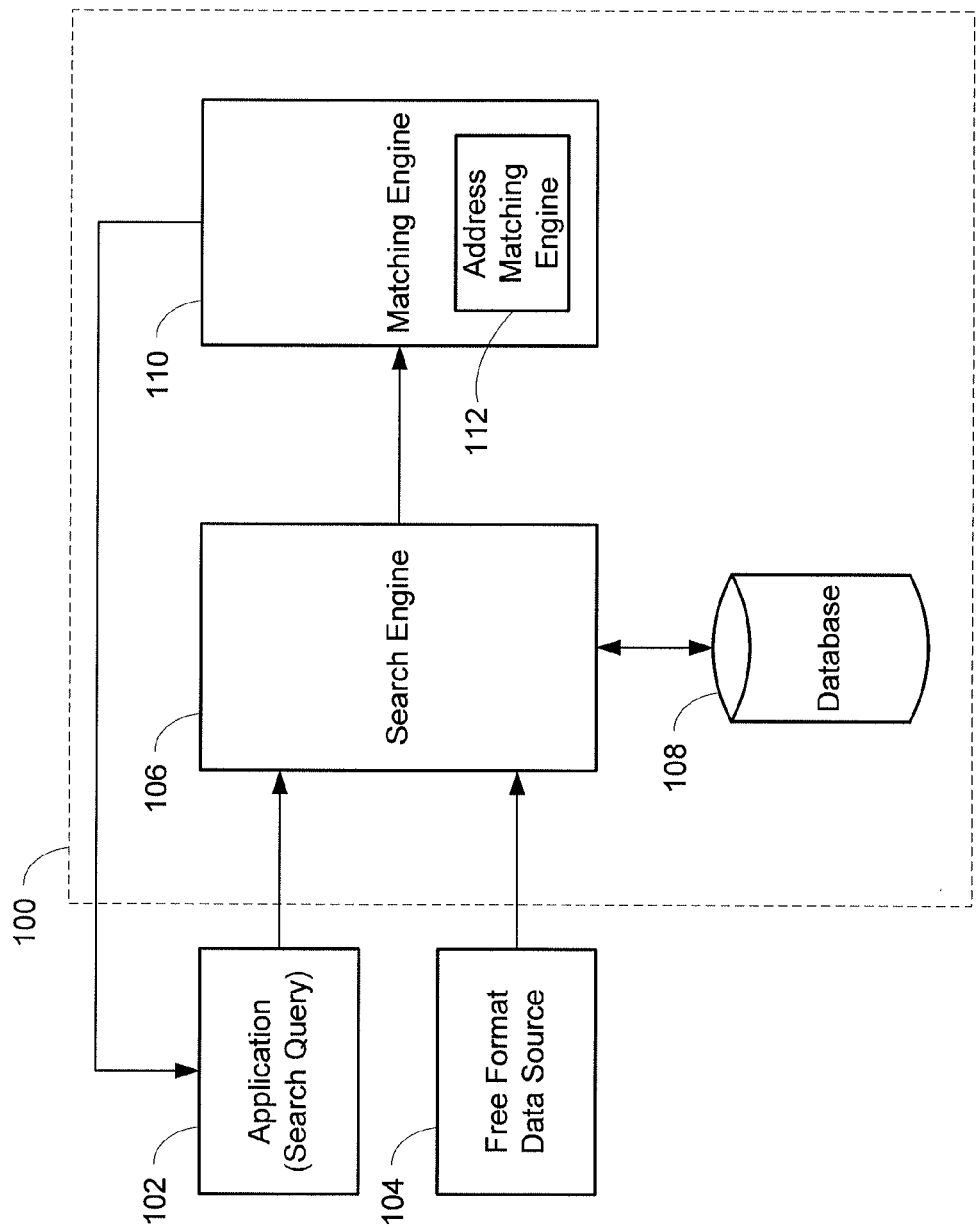
FIG. 1 is a block diagram illustrating a system including an address matching engine.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates a search system 100 for the retrieval and matching of database records, including an embodiment of matching of addresses in search queries and/or database records, in accordance with one or more principles of the invention. The system 100 may utilize information derived from a free format data source 104 loaded into the system 100 and/or information from a search query transmitted to the system 100 to return a set of records as a search result set. The system 100 may be part of a larger system, such as the International Credit Reporting System (iCRS) from TransUnion.

Figure 3:
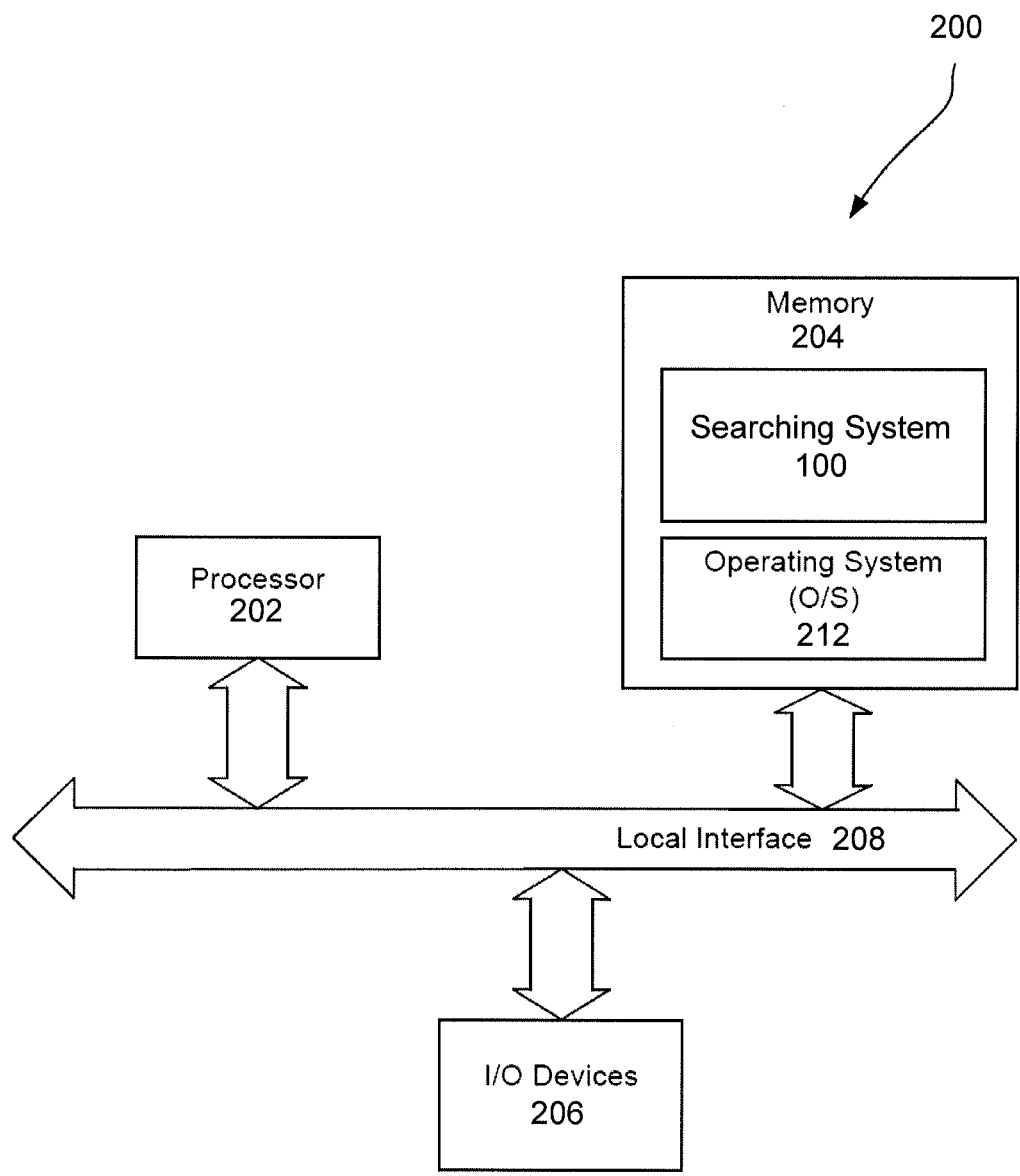
FIG. 3 is a block diagram of one form of a computer or server of FIGS. 1 and 2, having a memory element with a computer readable medium for implementing the system including an address matching engine.

Various components of the system 100 may be implemented using software executable by one or more servers or computers, such as a computing device 200 with a processor 202 and memory 204 as shown in FIG. 3, which is described in more detail below. In one embodiment, the system 100 can perform refined matching on a set of initially retrieved database records. The set of initially retrieved records may be found by a search engine 106 from a database 108, and a matching engine 110 that includes an address matching engine 112 may further process the initially retrieved records to find a more accurate set of results, based on the initial search query. In another embodiment, the address matching engine 112 may perform comparisons on a set of database records, based on the addresses in each of the records. The comparisons may be performed to determine whether the records should be merged, for example, or to determine whether the records match. A socket server (not shown) may be included in the system 100 to manage connections with client applications. Multiple requests may be sent through the socket server when a socket connection is maintained, or a new socket connection may be required for each request.

An application 102 may generate and initiate a search query to retrieve one or more results from the database 108 that is derived from the data in the free format data source 104. The search query may be intended to retrieve the record of a particular subject consumer. The application 102 may be a software application, for example, that is executing at a credit bureau and/or at a member of the credit bureau, including financial institutions, insurance companies, utility companies, etc. that wish to retrieve data related to a consumer, such as credit information. For example, a search query may be initiated by a bank when a consumer applies for a loan so that the bank can examine the consumer's credit report to assess the creditworthiness of the consumer. The bank can input the consumer's personal identifying information in the search query in order to retrieve the credit report. The application 102 may transmit a message that contains the search query to the system 100, and in particular, the search engine 106. The message may be in a defined JSON (JavaScript Object Notation) format, Extensible Markup Language (XML), or other format. Search results from the search engine 106 may be further refined by the matching engine 110 and the address matching engine 112. The refined results of the search initiated by the search query may be returned to the application 102 by the matching engine 110.

A free format data source 104 may include raw consumer data that is not consistently formatted and/or is unstructured. Consumer data may include identifying information about a consumer as well as financial-related data, such as the status of debt repayment, on-time payment records, etc. Consumer data in the free format data source 104 may originate from a variety of sources, such as from public records, e.g., deeds, bankruptcy records, etc.; and members of credit bureaus, including financial institutions, insurance companies, utility companies, etc. The free format data source 104 may include minimal and/or incomplete identifying information in each record corresponding to a customer. Names and addresses in the free format data source 104 may be arbitrary, vague, and/or non-specific. For example, addresses in the free format data source 104 may include "near the railway station, Guntur", "the red house south of Joggers park", or "over by the water tank 30 steps from the village square". Such addresses may be valid and can receive mail but are non-specific as compared to the address formats used in developed markets. Each of the addresses may be contained in an inconsistent number of fields and/or may be arbitrarily divided into a single field or multiple fields. Other data in the free format data source 104 may be duplicative and therefore not unique enough to positively identify a particular consumer by itself. For example, the same account number may be used for loan accounts corresponding to different consumers at different branches of the same bank. In this case, further identifying information must be used to uniquely identify a particular consumer.

Raw data from the free format data source 104 may be processed by the search engine 106 and placed in the database 108. In some embodiments, the raw data may be normalized by the search engine 106 and placed in the database 108. Search queries to the search engine 106 may be used to retrieve an initial set of records from the database 108. In some embodiments, the search queries may be normalized and/or transformed by the search engine 106 prior to being executed. Normalization of the raw data and search queries into a condensed normalized format may allow for fuzzier matching of data. A portion or all of the raw data and search queries, such as names, addresses, dates of birth, etc., may be normalized. Normalization can include using exact and pattern substitutions using regular expressions to standardize the data so that fields in a search query may match the corresponding data in the database 108 since both the fields and the data have been normalized.

Transformation of the search queries can include applying alterations to the search queries to allow the queries to be more expansive and inclusive than as specified in the original search queries. Transformed search queries may be sent with or without the original normalized search queries. Transformation rules may be customized for the particular market related to the free format data source. Embodiments of a search engine 106 are disclosed in a concurrently-filed commonly-assigned non-provisional application, titled "System and Method for Subject Identification From Free Format Data Sources" (U.S. patent application Ser. No. 13/539,053, filed Jun. 29, 2012), which is hereby incorporated by reference in its entirety. Search engines utilizing any type of searching algorithm may also be implemented in the search engine 106.

The matching engine 110 and the address matching engine 112 may process the search query and/or the initial set of records retrieved by the search engine 106 from the database 108. A refined set of search results that more accurately match the search query may be returned to the application 102 by the matching engine 110. Embodiments of a matching engine 110 are disclosed in a concurrently-filed commonly-assigned non-provisional application, titled "System and Method for Matching of Database Records Based on Similarities to Search Queries" (U.S. patent application Ser. No. 13/538,926, filed Jun. 29, 2012), which is hereby incorporated by reference in its entirety.

In one embodiment, the matching engine 110 may screen the initial set of records by examining the names and/or name initials in the records. The search query and the records may be normalized by the matching engine 110, prior to assigning matching strength points to each of the records with respect to the search query. Normalization of the search query and the records may be performed in the same, similar, or different manner as the normalization of the raw data and the search queries described above with respect to the search engine 106. In particular, fields of the search query may be compared to fields in the records to determine the degree to which they match. Using the assigned matching strength points, the matching engine 110 may keep or reject records based on a set of predetermined criteria. If only one record remains, that record may be returned to the application 102 as the record that has the most likelihood of matching the search query for the subject consumer. If more than one record remains, the matching engine 110 may determine the degree of similarity between the remaining records. None, some, or all of the remaining records may be merged together if the records are similar enough. The merged record(s) may then be returned to the application 102 as the record(s) that have the most likelihood of matching the search query for the subject consumer. Records returned to the application 102 by the matching engine 110 have a statistically significant probability of belonging to the subject consumer in question.

Figure 2:
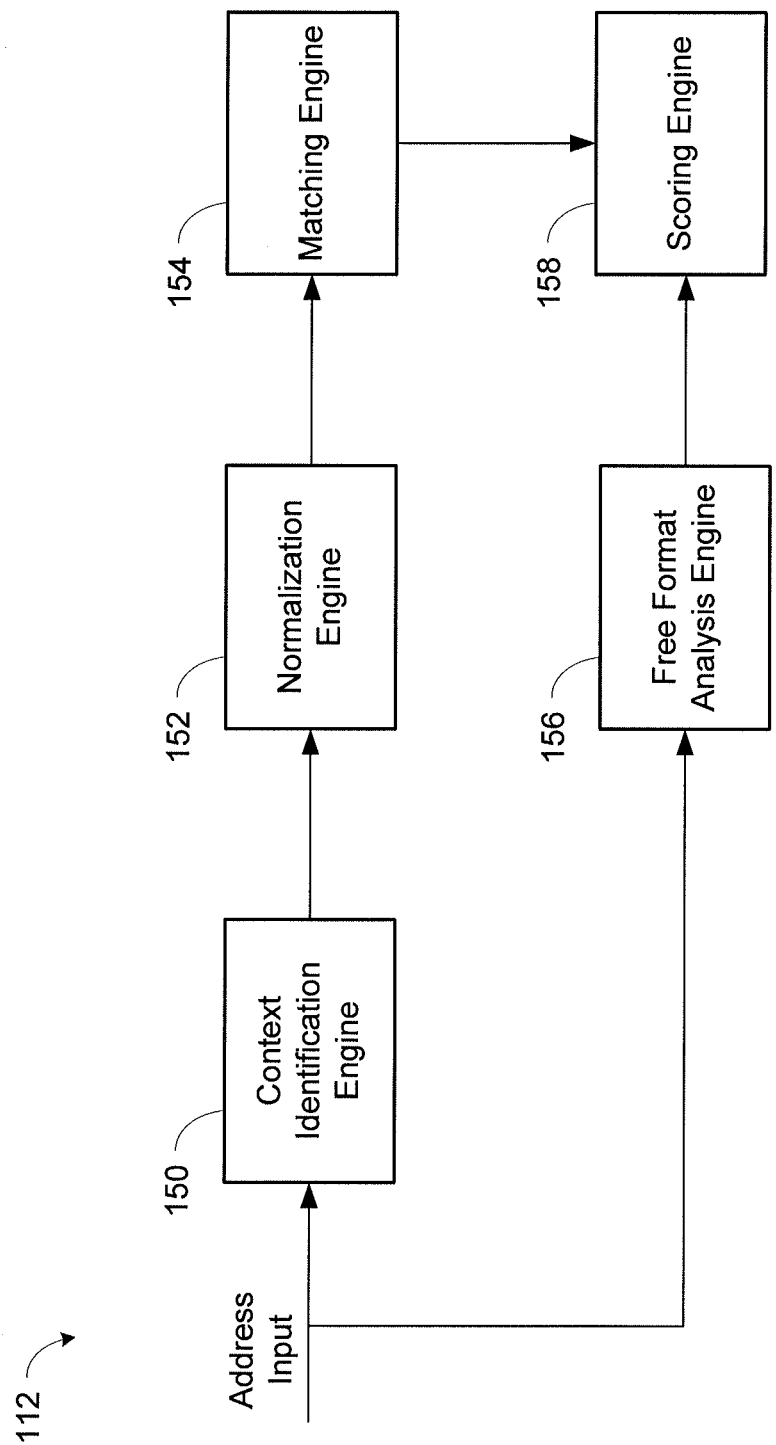
FIG. 2 is a block diagram illustrating an address matching engine for matching of addresses based on contextual identification of address parts and free format token analysis of the addresses.

FIG. 2 illustrates the address matching engine 112 that may match addresses to one another for rendering an address likeness score or evaluate the similarities between addresses. In one embodiment, the address matching engine 112 may be used as part of a matching engine 110 that receives addresses in database records from a search engine 106, as described above. In other embodiments, the address matching engine 112 may be used by itself or in conjunction with other systems in order to match addresses from any source, such as a data file or other media. For example, the address matching engine 112 may be utilized to de-duplicate multiple addresses for a particular consumer or verify an address match during a dispute process.

The address matching engine 112 may perform a contextual identification analysis of addresses to identify parts of the addresses, as shown in FIG. 2. The address matching engine 112 may also perform a free format token analysis of the addresses. To perform the contextual identification analysis, a context identification engine 150 may receive addresses from a source, such as a database, search query, file, or other media. The number of addresses received may vary, depending on the desired usage of the address matching engine 112. For example, an input address and one or more candidate addresses may be transmitted to the address matching engine 112 so that the input address may be compared to the candidate addresses. As another example, multiple input addresses and multiple candidate addresses may be transmitted to the address matching engine 112 so that each of the input addresses may be compared to the multiple candidate addresses. In this case, the address matching engine 112 may return multiple address likeness scores and/or best matches, as described below, for each of the compared input addresses.

The engine 150 may deterministically evaluate strings in the addresses to accomplish the contextual identification analysis. For example, the addresses may be deconstructed to determine the different types of address parts, such as apartment/flat number, house number, post office box, floor, building, complex, street, geographical direction, district, tehsil, stand number, barrio, village, suburb, town, city, and state. Some or all of the address part types may be used by the engine 150, depending on the region or locale. For example, district and thesil may be used in South Asian countries, such as India and Pakistan; stand number may be used in African countries; and barrio may be used in Central American and South American countries. Other address part types may be utilized. Matching particular key words or acronyms in the address and/or applying regular expressions to the addresses may locate the strings that identify the type of address part and their associated data. Once the string identifying the type of address part is found, then the data associated with that type may be extracted. The contextual identification analysis may be configurable and modified to best meet the standards and needs of a particular locale. For example, the types of address parts may vary based on the country or region of the addresses due to differing formats.

The identified address parts and the associated data may be normalized by a normalization engine 152. Normalization of the address parts and associated data may be performed in the same, similar, or different manner as the normalization of the raw data and the search queries described above with respect to the search engine 106 or other components of the matching engine 110. The normalized address parts that have like types may be compared to one another with a matching engine 154. For example, the associated data for an apartment/flat number in one address will be compared to the associated data for an apartment/flat in another address. The comparison may include direct matching of data, matching numbers from strings, matching and/or expanding initials or acronyms, configurable phonetic matching, awareness of and/or ignoring noise words (e.g., "and", "to", "site"), configurable known replacement strings, fuzzy string algorithms, word concatenation algorithms, pluralization algorithms, numerical versus non-numerical token analysis, and/or other techniques.

The engine 154 may calculate and assign a contextual matching score based on the comparison. The contextual matching score may be weighted or unweighted based on the type of address part and the strength of the matching. Subscores for each address part type in the addresses may also be calculated and assigned. The weight given to a subscore for a particular address part type may vary based on how specific the matched piece of associated data is to the address. For example, a matching apartment/flat number may be given more weight than a matching city name. As another example, a matching street name may be given less weight than a matching building name or a matching complex name. Particular address part types may be positively and/or negatively weighted. For example, a weight may be negative if the compared data mismatches and a weight may be positive if the compared data matches. Each type of address part may be weighted differently or the same when calculating and assigning the contextual matching score.

A free format analysis engine 156 may also receive the addresses from the source. The engine 156 may perform a free format token analysis of the addresses before, in parallel with, or after the contextual identification analysis performed by the context identification engine 150. The free format token analysis may be performed without any contextual understanding of the addresses. Different techniques may be utilized by the engine 156 to perform the free format token analysis, such as comparing singular and plural variations of strings, phonetic analyses, fuzzy string algorithms, word concatenation algorithms, pluralization algorithms, numerical versus non-numerical token analysis, and/or other techniques. The free format token analysis may be performed so that the addresses are compared in both directions such that there is comprehensive matching of strings in the addresses. For example, the string "Overberg" may not match the string "Berg", but the string "Berg" may match the string "Overberg". A free format matching score may be calculated and assigned by the engine 156, based on the free format token analysis. The free format matching score may be based on weighting of matching scores for individual strings, and/or may be based on a percentage of how much individual strings matched. The weighting used in calculating the free format matching score may be positively and/or negatively weighted.

An address likeness score, based on the contextual matching score and the free format matching score, may then be calculated and assigned by a scoring engine 158. A scoring algorithm may determine the address likeness score by weighting none, one, or both of the contextual matching score and the free format matching score, and/or weighting the components that make up the contextual matching score and the free format matching score. The scoring algorithm that is utilized to determine the address likeness score may vary based on the data available for a particular region or locale.

In some embodiments, a set of interior scores may be built by the scoring algorithm based on geographical specificity of the data in the addresses and the free format matching score. The geographical specificity may include varying values for an address part type based on how specific the data for a matched address part type is to an address. The address likeness score may be based on the weight of each geographic value and the total score across the set of interior scores and the free format matching score. In this way, addresses may be determined as not matching when many pieces of data are alike but data for an address part type with a more specific geographical specificity does not match. Similarly, addresses may also be determined as matching when addresses do not have many discernible address part types but data for an address part type with a more specific geographical specificity does match.

The address likeness score may be utilized to return one or more of the best matching addresses from the set of addresses that were input to the engine 112. For example, the candidate addresses with the highest address likeness score, due to their comparison to an input address, may be transmitted from the engine 112 to an application that initiated the address matching. The address likeness score may also be utilized to determine whether a search query and/or records that contain the addresses match one another. In addition, the scoring engine 158 may categorize the address likeness score as an address matching strength, such as an exact match, a strong match, a partial match, and/or no match. Records that have a certain address matching strength may also be flagged to be merged. The address likeness score, the address matching strength, and/or a merge flag may be returned to the application 102, such as through the socket server, for example. In some embodiments, the best match and other strongly matched addresses may be returned to the application 102. The address likeness score may be customized and/or localized to the particular region or locale to accommodate the system requirements and needs of an application or system that may have called the address matching engine 112.

FIG. 3 is a block diagram of a computing device 200 housing executable software used to facilitate the search system 100 and/or the address matching engine 112. One or more instances of the computing device 200 may be utilized to implement any, some, or all of the components in the system 100, including the search engine 106, the matching engine 110, and the address matching engine 112. Computing device 200 includes a memory element 204. Memory element 204 may include a computer readable medium for implementing the system 100, and for implementing particular system transactions. Memory element 204 may also be utilized to implement the database 108. Computing device 200 also contains executable software, some of which may or may not be unique to the system 100.

In some embodiments, the system 100 is implemented in software, as an executable program, and is executed by one or more special or general purpose digital computer(s), such as a mainframe computer, a commodity server, a personal computer (desktop, laptop or otherwise), personal digital assistant, or other handheld computing device. Therefore, computing device 200 may be representative of any computer in which the system 100 resides or partially resides.

Generally, in terms of hardware architecture as shown in FIG. 3, computing device 200 includes a processor 202, a memory 204, and one or more input and/or output (I/O) devices 206 (or peripherals) that are communicatively coupled via a local interface 208. Local interface 208 may be one or more buses or other wired or wireless connections, as is known in the art. Local interface 208 may have additional elements, which are omitted for simplicity, such as controllers, buffers (caches), drivers, transmitters, and receivers to facilitate external communications with other like or dissimilar computing devices. Further, local interface 208 may include address, control, and/or data connections to enable internal communications among the other computer components.

Processor 202 is a hardware device for executing software, particularly software stored in memory 204. Processor 202 can be any custom made or commercially available processor, such as, for example, a Core series or vPro processor made by Intel Corporation, or a Phenom, Athlon or Sempron processor made by Advanced Micro Devices, Inc. In the case where computing device 200 is a server, the processor may be, for example, a Xeon or Itanium processor from Intel, or an Opteron-series processor from Advanced Micro Devices, Inc. Processor 202 may also represent multiple parallel or distributed processors working in unison.

Memory 204 can include any one or a combination of volatile memory elements (e.g., random access memory (RAM, such as DRAM, SRAM, SDRAM, etc.)) and nonvolatile memory elements (e.g., ROM, hard drive, flash drive, CDROM, etc.). It may incorporate electronic, magnetic, optical, and/or other types of storage media. Memory 204 can have a distributed architecture where various components are situated remote from one another, but are still accessed by processor 202. These other components may reside on devices located elsewhere on a network or in a cloud arrangement.

The software in memory 204 may include one or more separate programs. The separate programs comprise ordered listings of executable instructions for implementing logical functions. In the example of FIG. 3, the software in memory 204 may include the system 100 in accordance with the invention, and a suitable operating system (O/S) 212. Examples of suitable commercially available operating systems 212 are Windows operating systems available from Microsoft Corporation, Mac OS X available from Apple Computer, Inc., a Unix operating system from AT&T, or a Unix-derivative such as BSD or Linux. The operating system O/S 212 will depend on the type of computing device 200. For example, if the computing device 200 is a PDA or handheld computer, the operating system 212 may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system 212 essentially controls the execution of other computer programs, such as the system 100, and provides scheduling, input-output control, file and data management, memory management, and communication control and related services.

If computing device 200 is an IBM PC compatible computer or the like, the software in memory 204 may further include a basic input output system (BIOS). The BIOS is a set of essential software routines that initialize and test hardware at startup, start operating system 212, and support the transfer of data among the hardware devices. The BIOS is stored in ROM so that the BIOS can be executed when computing device 200 is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, and Lua. Components of the system 100 may also be written in a proprietary language developed to interact with these known languages.

I/O device 206 may include input devices such as a keyboard, a mouse, a scanner, a microphone, a touch screen, a bar code reader, or an infra-red reader. It may also include output devices such as a printer, a video display, an audio speaker or headphone port or a projector. I/O device 206 may also comprise devices that communicate with inputs or outputs, such as a short-range transceiver (RFID, Bluetooth, etc.), a telephonic interface, a cellular communication port, a router, or other types of network communication equipment. I/O device 206 may be internal to computing device 200, or may be external and connected wirelessly or via connection cable, such as through a universal serial bus port.

When computing device 200 is in operation, processor 202 is configured to execute software stored within memory 204, to communicate data to and from memory 204, and to generally control operations of computing device 200 pursuant to the software. The system 100 and operating system 212, in whole or in part, may be read by processor 202, buffered within processor 202, and then executed.

In the context of this document, a "computer-readable medium" may be any means that can store, communicate, propagate, or transport data objects for use by or in connection with the system 100. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system 100 can be embodied in any type of computer-readable medium for use by or in connection with an instruction execution system or apparatus, such as a computer.

For purposes of connecting to other computing devices, computing device 200 is equipped with network communication equipment and circuitry. In a preferred embodiment, the network communication equipment includes a network card such as an Ethernet card, or a wireless connection card. In a preferred network environment, each of the plurality of computing devices 200 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 200 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Figure 4:
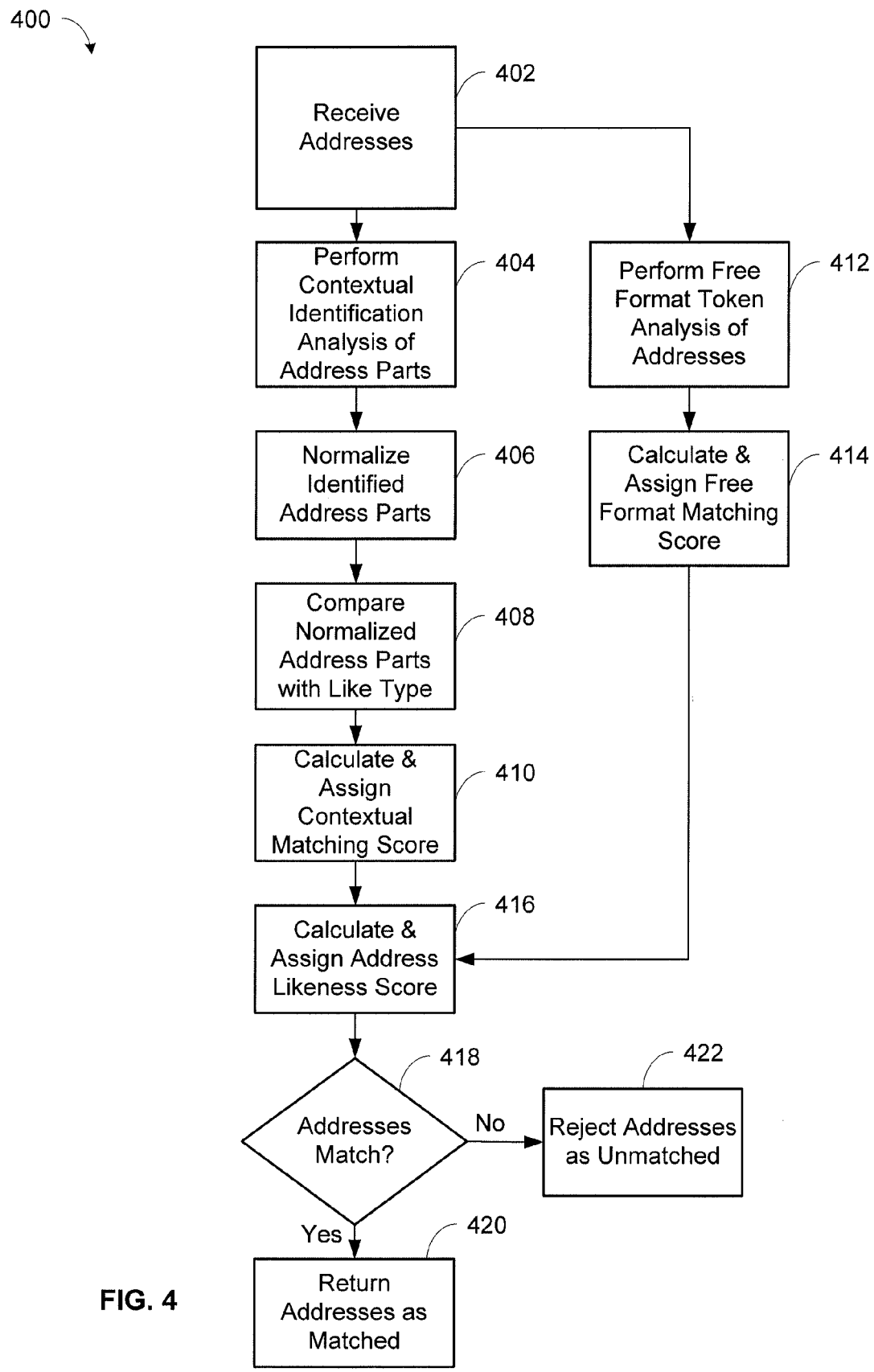
FIG. 4 is a flowchart illustrating operations for performing contextual matching and free format token matching of addresses using the systems of FIGS. 1 and 2.

An embodiment of a process 400 for the matching of addresses is shown in FIG. 4. The process 400 can result in the calculation of an address likeness score and the return of one or more best matching candidate addresses, as compared to one or more input addresses. In some embodiments, the address likeness score may assist in the refinement of a set of search results from a search engine 106 through merging of matching database records. In other embodiments, the address likeness score may be used to determine the best matching candidate addresses, as compared to an input address. The address matching engine 112 may perform all or part of the process 400.

At step 402, addresses may be received at the address matching engine 112. The addresses may be received from any source and the number of addresses that are received at the engine 112 may vary. In one embodiment, the addresses may be from a set of retrieved search records and/or of a search query that were received from a search engine 106 and/or an application 102. The records may have been retrieved from the database 108 by the search engine 106 based on a search query received from the application 102. In another embodiment, the addresses may be from a source or application that wishes to compare one or more input addresses to one or more candidate addresses to determine their similarities.

A contextual identification analysis of the addresses may be performed by the context identification engine 150 to identify address parts. The engine 150 may deterministically evaluate strings in the addresses and deconstruct the addresses to determine the different types of address parts and their associated data. The different types of address parts may include, for example, apartment/flat number, house number, post office box, floor, building, complex, street, geographical direction, district, tehsil, stand number, barrio, village, suburb, town, city, and state. Matching particular key words or acronyms in the address and/or applying regular expressions to the addresses may locate the strings that identify the type of address part and the data included in the particular type. Once the string identifying the type of address part is found, then the data associated with that type may be extracted. The associated data may be extracted following or before the string identifying the address part, depending on the type of address part. As an example, an apartment/flat number (i.e., the associated data for an apartment/flat) typically follows the word "Flat", "Apt", or the like. As another example, the name of a street (i.e., the associated data for a street) is typically prior to the word "Street", "Road", "Ave" or the like. The contextual identification analysis may be configurable and modified to best meet the standards and needs of a particular locale.

For example, if an address includes "Flat 124 Main Road", the engine 150 may identify "Flat" as an address part, e.g., as an apartment/flat type, and "124" as the associated data. In this case, because the address part is an apartment/flat type, the engine 150 may extract the piece of associated data "124" following the word "Flat" until a non-numeric, non-alphanumeric, and/or blank space is encountered. The engine 150 may also identify "Road" as another address part, e.g., as a street type, and "Main" as the associated data. In this case, because the address part is a street type, the engine 150 may extract the piece of associated data "Main" prior to the word "Road" until a non-numeric, non-alphanumeric, and/or blank space is encountered. As another example, if an address includes "High Ave Bldg 23", the engine 150 may identify "Ave" as a street address part type and "High" as the associated data. The engine 150 may also identify "Bldg" as another address part, e.g., as a building type, and "23" as the associated data. As a further example, if an address includes "Gulmohar Estates", the engine 150 may identify "Estates" as a complex address part type and "Gulmohar" as the associated data. Each of the identified pieces of associated data may be subsequently be compared to like types of associated data for matching purposes, as described in more detail below.

The identified address parts and their associated data may be normalized at step 406 by a normalization engine 152. The normalization of the address parts and the associated data may be based on one or more normalization rules for standardizing the data prior to matching and scoring procedures. Normalization of the address parts and associated data may be performed in the same, similar, or different manner as the normalization of the raw data and the search queries described above with respect to the search engine 106 or other components of the matching engine 110. Normalization of address parts and their associated data may be performed by the engine 152 due to the use of obsolete and/or abbreviated street, city, and town names (e.g., "Bombay" or "Bom" instead of "Mumbai"), and variations and misspellings in such names. Lookup tables may be utilized by the engine 152 when normalizing address parts and associated data for quick decoding and normalization.

Examples of normalization rules for address parts and their associated data include setting all text to upper case characters; validating state codes, postal codes, and postal index numbers (PIN); extracting a supplementary PIN; concatenating address fields into a single string; expanding abbreviations; correcting obsolete or improper spellings; checking for non-allowed foreign addresses; converting place names to the same language; and removing certain words and/or noise words (e.g., "CARE OF"). For example, the PIN of "560 079" may be compacted so that the normalized PIN becomes "560079". As another example, the address "1ST MAIN ROAD" may have the numeric term "1ST" modified so that the normalized address becomes "FIRST MAIN ROAD". As a further example, the address "INDIAN RD N BOM" may have the abbreviations "RD" and "N" expanded and the obsolete city name "BOM" changed so that the normalized address becomes "INDIAN ROAD NORTH MUMBAI". In another example, the address "CARE OF A P KUMAR 13 W MANIKKAM ST" may have its noise words "CARE OF" and associated words "A P KUMAR" removed, and the abbreviations "W" and "ST" expanded so that the normalized address become "13 WEST MANIKKAM STREET". As further examples, the address "SECOND FLR" may have "SECOND" changed to "2" and "FLR" changed to "FLOOR" so that the normalized address becomes "2 FLOOR". Similarly, the address "IInd FL" may also be normalized to "2 FLOOR" because "IInd" may be changed to "2" and "FL" may be changed to "FLOOR". As another example, an address includes a place name of "Kaapstad" may be normalized to "Cape Town" because "Kaapstad" is the Afrikaans equivalent of the city "Cape Town" in English.

At step 408, a matching engine 154 may compare normalized address parts and their associated data that have like types. For example, the associated data for a building address part type in one address will be compared to the associated data for a building address part type in another address. The comparison may include direct matching of data, matching numbers from strings (e.g., comparing "Apt 2F", "Flat 2", and "Door No. II"), matching and/or expanding initials or acronyms (e.g., comparing "ABC", "A.B.C.", and "American Bank Consulting"), configurable phonetic matching (e.g., comparing "Bishnu" and "Vishnu"), awareness of and/or ignoring noise words (e.g., "and", "to", "site"), and/or configurable known replacement strings.

For example, if one address includes "Flat 124 Main Road" and another address includes "Apt. 124 Main Ave.", the matching engine 154 may compare the associated data "124"

as contextually similar information because "Flat" and "Apt." are contextually equivalent. The engine 154 may also compare the associated data "Main" together because "Road" and "Ave." are contextually equivalent. As another example, if one address includes "14 6TH STREE" and another address includes "14 64TH STREET", the engine 154 may compare the associated data "14" as contextually similar information falling under a house number address part type. The engine 154 may also compare the associated data "6TH" and "64TH" as contextually similar information because "STREE" and "STREET", respectively, are of the street address part type.

A contextual matching score may be calculated and assigned by the engine 154 at step 410 based on the comparison of the normalized address parts and their associated data with like address part types at step 408. The contextual matching score may be weighted or unweighted based on the type of address part and the strength of the matching. Subscores for each address part type in the addresses may also be calculated and assigned at step 410. The weight given to a subscore for a particular address part type may vary based on how specific the matched piece of associate data is to the address, such as how important the particular address party type is to matching addresses. For example, a matching apartment/flat number may be given more weight than a matching city name. As another example, a matching street name may be given less weight than a matching building name or complex name.

In one embodiment, the weights given to a matching address part type may be given to an apartment/flat number or house number; building name or complex name; village name or street name; city name; and state name, in order of decreasing weight. Particular types of address part may be positively and/or negatively weighted. For example, a weight may be negative if the compared data mismatches and a weight may be positive if the compared data matches. Each type of address part may be weighted differently when calculating and assigning the contextual matching score. In this way, more significant address part types may be allowed to have a higher value due to their greater weighting, which may contribute to an easier matching of addresses later in the process 400.

After receiving addresses at the address matching engine 112 at step 402, a free format analysis engine 156 may perform a free format token analysis at step 412. The free format token analysis at step 412 may be performed by the engine 156 before, in parallel with, or after the contextual identification analysis performed by the context identification engine 150, as described above with reference to steps 404, 406, 408, and 410. The free format token analysis may be performed without any contextual understanding of the addresses. Different techniques may be utilized by the engine 156 to perform the free format token analysis, such as comparing singular and plural variations of strings, phonetic analyses, and other techniques. A free format matching score may be calculated and assigned by the engine 156 at step 414, based on the free format token analysis of step 412. The free format matching score may be based on weighting of matching scores for individual strings, and/or may be based on a percentage of how much individual strings matched. The weighting used in calculating the free format matching score at step 414 may be positively and/or negatively weighted.

At step 416, an address likeness score may be calculated and assigned by a scoring engine 158, based on the contextual matching score assigned at step 410 and the free format matching score assigned at step 414. A scoring algorithm may determine the address likeness score by weighting none, one, or both of the contextual matching score and the free format matching score, and/or weighting the components that make up the contextual matching score and the free format matching score. In some embodiments, a set of interior scores may be built by the scoring algorithm based on geographical specificity of the data in the addresses and the free format matching score. The geographical specificity may include varying values for an address part type based on how specific the data for a matched address part type is to an address. The address likeness score may be based on the weight of each geographic value and the total score across the set of interior scores and the free format matching score. In this way, addresses may be determined as not matching when many pieces of data are alike but data for a significant specific address part type does not match. Similarly, addresses may also be determined as matching when addresses do not have many discernible address part types but data for a significant specific address part type does match.

The address likeness score may be utilized to determine whether the addresses match one another at step 418, such as if an input address matches one or more candidate addresses. The address likeness score may be customized and/or localized to the particular region or locale to accommodate the system requirements and needs of an application or system that may have called the address matching engine 112 and the process 400. In addition to or in lieu of the address likeness score, the scoring engine 158 may categorize the address likeness score at step 416 as an address matching strength, such as an exact match, a strong match, a partial match, and/or no match. In some embodiments, records with addresses that have a certain address matching strength may be flagged to be merged. Combining configurable contextual matching analysis and free format token analysis may result in a more accurate match of addresses.

The address likeness score, the address matching strength, a merge flag, and/or one or more best matching addresses may be transmitted from the address matching engine 112 at step 420. However, if addresses do not match, based on the address likeness score, then the fact that particular addresses do not match can be transmitted from the address matching engine 112 at step 422. Step 422 may be optional if the application 102 desires to only be informed about matching addresses.

In the case where addresses match at step 420, one or more best matching addresses may be transmitted from the engine 112. For example, if an input address and one or more candidate addresses are transmitted to the engine 112, the input address may be compared to the candidate addresses. The engine 112 may return an address likeness score for each candidate address as compared to the input address. The engine 112 may also return the candidate addresses that best match the input address. As another example, if multiple input addresses and multiple candidate addresses are transmitted to the address matching engine 112, each of the input addresses may be compared to the multiple candidate addresses. The engine 112 may return an address likeness score for each candidate address as compared to each of the input addresses. The engine 112 may also return the candidate addresses that best match each of the input addresses. Accordingly, if there are two input addresses and fifty candidate addresses transmitted to the engine 112 for comparison, there may be up to 100 address likeness scores returned, as well as a number of best matching candidate addresses for each of the two input addresses.

Examples of matching using the address matching engine 112 and the associated process 400 are described as follows.

In a first example, an address includes:
JN 2168 A2 GULMOHAR APPARTMENT SECTOR 9 VASHI MUMBAI 400703
and another address includes:
RM NO A-2, GRD FLR GULMOHAR APTS, BLDG
68 TYPE JN2, SEC 9 VASHI NAVI MUMBAI
400703
400703

The address matching engine 112 and the process 400 may determine that these addresses are a strong match when compared. In particular, a sufficient number of address parts match when contextual identification analysis and comparison is performed. The contextual identification analysis may identify complex address part types based on the strings "APPARTMENT" and "APT" and extract associated data "GULHOMAR". Building address part types may be identified based on the string "BLDG" and extract associated data "JN 2168" and "68 TYPE JN2". Room address part types may be identified based on the string "RM NO" and extract associated data "A2" and "A-2". Sector address part types may be identified based on the strings "SECTOR" and "SEC" and extract associated data "9". The postal codes ("27" and "400703") and village/city names ("VASHI" and "MUMBAI") also match, which may be found using the free format token analysis. Consequently, the addresses may be determined to be a strong match.

In a second example, an address includes:
911 POONAMALLEE HIGH ROADPURASAIWALKAM
CHENNAI
600007
and another address includes:
N0OL 911 POONAMALEE HIGH ROAD NEAR ABU
PALACE CHENNAI
600084

The address matching engine 112 and the process 400 may determine that these addresses are a strong match when compared. In particular, the contextual identification analysis may identify a street name address part type based on the string "ROAD" and extract associated data "POONAMALLEE HIGH" and "POONAMALEE HIGH". The street number ("911") may be extracted as prior to the street name and matched. A postal code ("33") and city name ("CHENNAI") match, which may be found using the free format token analysis. Although another postal code differs slightly ("600007" vs. "600084"), the addresses are a strong match because the rest of the address parts are sufficient matches.

As a third example, an address includes:
ANAND BHAVAN 14 6TH STREE SURENDRANAGAR
ADAMBAKKAM CHENNAI
33
600088
and another address includes:
ANAND BAVAN 14 64TH STREET SURENDAR
NAGAR ADAMBAKKAM
600088

The address matching engine 112 and the process 400 may determine that these addresses are a partial match when compared. In particular, the contextual identification analysis may identify a street name address part type based on the strings "STREE" and "STREET" and extract the associated data "6TH" and "64TH". The postal codes ("33" and "600088") match as do portions of the complex name ("ANAND BHAVAN" and "ANAND BAVAN"), street number ("14"), and village/town names ("SURENDRANGAR ADAMBAKKAM" and "SURENDAR NAGAR ADAMBAKKAM"), which may be found using the free format token analysis. However, because the street name differs ("6TH" vs. "64TH"), the addresses are determined to be a partial match.

As a fourth example, an address includes:
805 BAKIBIHARI APARTMENTS SECTOR 56
GURGAON
06
122015
and another address includes:
805, PANKE BIHARI APTS, CH 55, SECTO
R-56, NR TO: SUN CITY, GURGAON INDIA
122001

The address matching engine 112 and the process 400 may determine that these addresses are a partial match when compared. In particular, the contextual identification analysis may identify a complex address part type based on the strings "APARTMENTS" and "APTS" and extract the associated data "BAKIBIHARI" and "PANKE BIHAR". A sector address part type may be identified based on the strings "SECTOR" and "SECTO R" (where "R" is on a separate line from "SECTO") and the associated data "56" may be extracted. An apartment/flat number address part type may be identified based on the string "#" and the apartment/flat number "805" extracted. The city name ("GURGAON") and a postal code ("06") match, which may be found using the free format token analysis. However, because the complex name ("BAKIBIHARI" vs. "PANKE BIHARI") and another postal code ("122015" vs. "122001") differ, the addresses may be determined to be a partial match.

As a fifth example, an address includes:
FLAT NO 357 AIR FORCE & NAVAL OFFIER
ENCLAVE PLOT NO 11 SECTOR 7 DWARKA
DELHI NEW DELHI
110075
and another address includes:
357, AFNOE, PLT-11, SEC-7, DWARKA
07
110075

The address matching engine 112 and the process 400 may determine that these addresses are a strong match when compared. In particular, an apartment/flat number address part type may be identified by the contextual identification analysis based on the string "FLAT NO" and the associated data "357" extracted. A plot number address part type may be identified based on the strings "PLOT NO" and "PLT-" and the associated data "11" may be extracted. A sector number address part type may be identified based on the strings "SECTOR" and "SEC-" and the associated data "7" may be extracted. In addition, the acronym "AFNOE" and the string "AIR FORCE & NAVAL OFFIER ENCLAVE" are determined to be possibly equivalent because the initials strongly match as an acronym to the set of adjacent words in the address. A town name ("DWARKA") and postal codes ("07" and "110075") match, which may be found using free format token analysis. Taken as a whole, the addresses may be determined to be a strong match.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

The invention claimed is:

1. A method for matching a first address and a second address using a processor, the first address and the second address each associated with one or more consumers, the method comprising:
   receiving the first address and the second address at the processor;
   contextually identifying a first address part of the first address and a second address part of the second address, using the processor, wherein the first address part and the second address part each have an address part type that is alike, and wherein contextually identifying comprises:
      deterministically evaluating a first string in the first address to identify the first address part and a second string in the second address to identify the second address part, using the processor; and
      extracting first data from the first address and second data from the second address using the processor, based on the address part type of the first address part and the second address part;
   normalizing, using the processor, the first address part to produce a first normalized address part and the second address part to produce a second normalized address part, based on a normalization rule;
   comparing the first normalized address part and the second normalized address part, using the processor;
   calculating a contextual matching score, based on comparing the first normalized address part and the second normalized address part, using the processor;
   performing a free format token analysis of the first address and the second address, using the processor;
   calculating a free format matching score, based on performing the free format token analysis of the first address and the second address, using the processor;
   calculating an address likeness score, based on the contextual matching score and the free format matching score, using the processor; and
   transmitting the address likeness score from the processor.

2. The method of claim 1, wherein contextually identifying comprises:
   matching a first key word in the first address using the processor, the first key word for identifying the address part type of the first address part; and
   matching a second key word in the second address using the processor, the second key word for identifying the address part type of the second address part;
   wherein the first data and the second data are associated with the address part type.

3. The method of claim 2, wherein matching the first key word comprises matching an acronym in the first address, using the processor.

4. The method of claim 2, wherein extracting comprises:
   extracting the first data following or before the first key word of the first address, using the processor; and
   extracting the second data following or before the second key word of the second address, using the processor.

5. The method of claim 1, wherein the address part type of the first address part and the second address part comprises one or more of an apartment number, a house number, a post office box, a floor, a building, a complex, a street, a geographical direction, a district, a tehsil, a stand number, a barrio, a village, a suburb, a town, a city, or a state.

6. The method of claim 1, wherein comparing comprises comparing first data from the first address and second data from the second address, using the processor, wherein the first data and the second data are associated with the address part type of the first address part and the second address part.

7. The method of claim 1, wherein calculating the contextual matching score comprises:
   calculating a subscore for the address part type of the first address part and the second address part, using the processor;
   weighting the subscore based on a specificity of the address part type, using the processor; and
   calculating the contextual matching score based on the weighted subscore, using the processor.

8. The method of claim 1, wherein performing the free format token analysis comprises:
   comparing variations of a string in the first address and the second address, using the processor; and
   performing a phonetic analysis on the first address and the second address, using the processor.

9. The method of claim 1, wherein calculating the address likeness score comprises:
   weighting one or more of the contextual matching score or the free format matching score, using the processor; and
   calculating the address likeness score based on one or more of the weighted contextual matching score or the weighted free format matching score, using the processor.

10. The method of claim 1, wherein transmitting the address likeness score comprises:
    determining an address matching strength, based on the address likeness score, using the processor; and
    transmitting the address matching strength from the processor.

11. The method of claim 1, further comprising:
    determining whether to merge a first database record and a second database record, based on the address likeness score, using the processor, wherein the first database record is associated with the first address and the second database record is associated with the second address; and
    transmitting a merge flag from the processor, the merge flag indicating that the first database record and the second database record are matches.

12. A method for matching an address with a plurality of candidate addresses, using a processor, the address and the plurality of candidate addresses associated with one or more consumers, the method comprising:
    receiving the address and the plurality of candidate addresses at the processor;
    identifying an address part of the address and a plurality of candidate address parts of each of the plurality of candidate addresses, based on a contextual identification analysis of the address and the plurality of candidate addresses, using the processor, wherein the address part and the plurality of candidate address parts each have an address part type that is alike, and wherein identifying comprises:
       deterministically evaluating a first string in the address to identify the address part and a plurality of strings in each of the plurality of candidate addresses to identify the plurality of candidate address parts, using the processor; and extracting the address data from the address and the plurality of candidate address data from the plurality of candidate addresses using the processor, based on the address part type;

comparing address data with a plurality of candidate address data, using the processor, wherein the address data and the plurality of candidate address data is associated with the address part type;

calculating a contextual matching score, based on comparing the address data with the plurality of candidate address data, using the processor;

performing a free format token analysis of the address and the plurality of candidate addresses, using the processor;

calculating a free format matching score, based on performing the free format token analysis, using the processor;

calculating an address likeness score, based on the contextual matching score and the free format matching score, using the processor; and transmitting one or more matching addresses from the plurality of candidate addresses from the processor, based on the address likeness score.

13. The method of claim 12, wherein the address data and the plurality of candidate address data are associated with the address part type.

14. The method of claim 12, wherein the address part type comprises one or more of an apartment number, a house number, a post office box, a floor, a building, a complex, a street, a geographical direction, a district, a tehsil, a stand number, a barrio, a village, a suburb, a town, a city, or a state.

15. The method of claim 12:
further comprising normalizing, using the processor, the address part to produce a normalized address part and the plurality of candidate address parts to produce a plurality of normalized candidate address parts, based on a normalization rule;
wherein comparing comprises comparing the normalized address part with the plurality of normalized candidate address parts, using the processor.

16. The method of claim 12, wherein calculating the contextual matching score comprises:
calculating a subscore for the address part type of the address part and the plurality of candidate address parts, using the processor;
weighting the subscore based on a specificity of the address part type, using the processor; and
calculating the contextual matching score based on the weighted subscore, using the processor.

17. The method of claim 12, wherein calculating the address likeness score comprises:
weighting one or more of the contextual matching score or the free format matching score, using the processor; and
calculating the address likeness score based on one or more of the weighted contextual matching score or the weighted free format matching score, using the processor.

18. The method of claim 12, further comprising performing the contextual identification analysis of the address and the plurality of candidate addresses, using the processor, wherein performing the contextual identification analysis comprises:
matching a key word in the address using the processor, the key word for identifying the address part type of the address part;
matching a plurality of key words in the plurality of candidate addresses using the processor, the plurality of key words for identifying the address part type of the plurality of candidate address parts; and
extracting the address data from the address and the plurality of candidate address data from the plurality of candidate addresses using the processor, based on the address part type of the address part and the plurality of candidate address parts, wherein the address data and the plurality of candidate address data are associated with the address part type.

* * * * *